Nov. 3, 1953      A. S. VOLPIN      2,657,898
SMOOTH OPENING AUTOMATIC LUBRICATED GATE VALVE
Filed July 31, 1950      2 Sheets-Sheet 1

INVENTOR:
ALEXANDER S. VOLPIN
BY Murray Robinson
ATTORNEY

Nov. 3, 1953   A. S. VOLPIN   2,657,898
SMOOTH OPENING AUTOMATIC LUBRICATED GATE VALVE
Filed July 31, 1950   2 Sheets-Sheet 2

INVENTOR:
ALEXANDER S. VOLPIN
BY Murray Robinson
ATTORNEY

Patented Nov. 3, 1953

2,657,898

UNITED STATES PATENT OFFICE 2,657,898

SMOOTH OPENING AUTOMATIC
LUBRICATED GATE VALVE

Alexander S. Volpin, Houston, Tex.

Application July 31, 1950, Serial No. 176,831

5 Claims. (Cl. 251—63.5)

1

This invention pertains to automatic lubricated gate valves of the type having a lubricating and sealing system including an annular groove to receive sealing material surrounding the downstream flow passage when the gate is closed and receiving sealing material when the gate is closed from a sealing material or lubricant reservoir that is subjected to upstream pressure. The invention is particularly applicable to non-rising stem gate valves and will be described with reference thereto but it is also of considerable utility in connection with rising stem gate valves.

To insure perfect sealing it is desirable that the sealing groove be continuous around the flow passage and to this end I have heretofore placed the sealing groove entirely in the face of the gate as shown in my U. S. Patent Number 2,570,412. However it has been found that under certain operating conditions, i. e., pressures and sizes of valve parts, valves having the sealing groove in the gate face behave erratically when being opened, the valve stem suddenly moving axially to the extent permitted by the play in its bearings, producing one or more violent sharp impacts causing undesired wear on the parts of the valve and the nerves of the user. It is an object of the invention to eliminate this erratic behavior and produce a valve that opens smoothly under all circumstances.

It is believed that the aforementioned erratic operation is due to a variation in the friction between the valve and seat, the friction force being first above and then below the outward force on the valve stem due to line pressure. Consider a non-rising stem valve in closed position. If the restraining force of friction at the seat is greater than the outward force on the end of the valve stem due to line pressure the valve stem will be axially moved away from the gate to the limit permitted by the play between stem and gate and between stem and bearing. To open the valve the valve stem must be screwed down toward the gate until all the play in the bearing between stem and the gate is taken up before the gate moves. If after the gate starts to move the seat friction force falls below the force of the line pressure acting on the stem, the stem moves upward in its bearing away from the gate hammering on the valve body. Hence, if the friction force on the seat is near in magnitude to the force on the valve stem due to line pressure, the static friction force may be above the force due to line pressure and the dynamic friction force may be less than the line pressure force. In such case the operator will exert force to turn the stem until

2 static friction on the gate is exceeded whereupon the line pressure will hammer the stem upwards. Then the stem will momentarily stop long enough for static friction to again appear so that further turning of the stem will again force it downward, followed by further upward movement of the stem and another hammer blow. The valve will thus pound and chatter as it opens.

If even the dynamic friction force is greater than the line pressure force, there will still be a hammering when the valve cracks open, suddenly lowering the friction force to substantially zero. It appears therefore that to avoid pounding of the valve while opening, the friction force, both static and dynamic should be maintained below the line pressure force. In addition, lowering the friction force makes the valve easier to open. It is therefore an object of the invention to reduce the friction force on the valve gate.

The friction force on the valve gate, for any given coefficient of friction, is proportional to the normal force between the gate and its seat. Most of the gate, including both faces thereof, is exposed to upstream pressure but at least that part of the gate directly over the port in the seat is exposed only to downstream pressure so that there is a force on the gate pressing it against the seat that is at least equal to the port area multiplied by the difference in pressures between the upstream and downstream sides of the valve. With the construction of valve as aforementioned with the seal groove entirely in the gate, as soon as the gate opens sufficiently to expose the seal groove therein to downstream pressure, the entire area of the gate within the outer periphery of the seal groove is placed at downstream pressure thereby increasing the area subject to differential pressure by as much as 100 per cent. This greatly increases the friction force making the valve harder to open. Furthermore, it may raise the friction force above the line pressure force on the stem causing hammering in the manner previously outlined.

I have found that by placing the seal groove entirely in the valve seat instead of in the gate, it is never exposed to downstream pressure until the valve is cracked open, thereby eliminating the increase in friction force and attendant difficulties above referred to. However such construction alone would be unsatisfactory, for at the moment the valve was cracked open there would still be a pressure differential between the upstream and downstream sides of the valve and with the sealing fluid reservoir connected to upstream pressure and the seal groove exposed to downstream pressure, all of the sealing fluid would be forced out into the stream and lost. To avoid this latter difficulty a cut-off is placed in the line between the sealing fluid reservoir and the seal groove in the valve seat, the cut off being operated by movement of the valve so that opening movement of the valve both opens the gate and disconnects the groove from the reservoir, thereby preventing loss of lubricant, i. e., sealing fluid or grease, into the downstream port. In other words, the gate and cut off are interlocked so that when one is open the other is closed.

For further details of a preferred embodiment of the invention reference will now be made to the accompanying drawings wherein.

Figure 1:
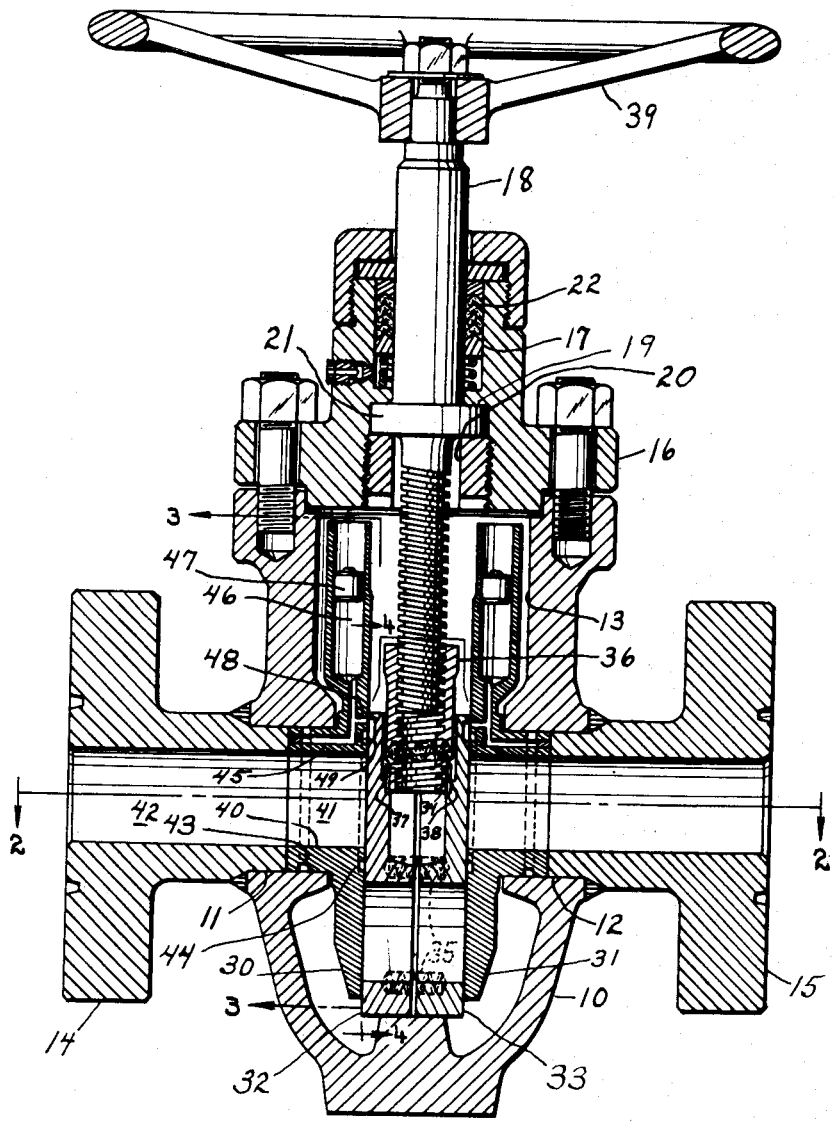
Figure 1 is a section through the flow and stem axis of a valve embodying the invention.
Figure 2:
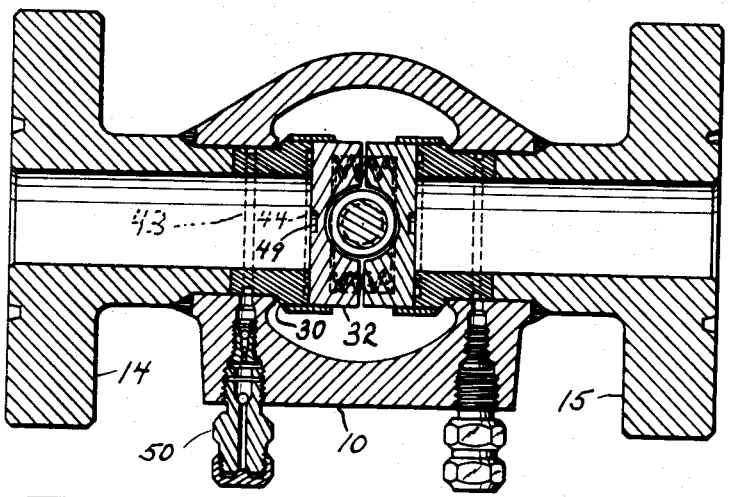
Figure 2 is a section generally through the flow axis of the valve taken perpendicular to the valve stem along line 2—2 of Figure 1.
Figure 3:
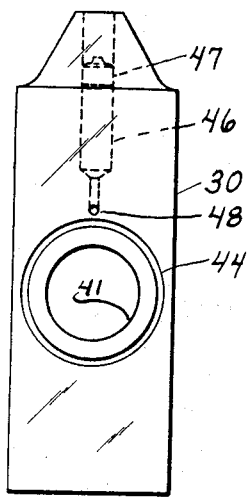
Figure 3 is an elevation of one of the valve seats.
Figures 4, 5:
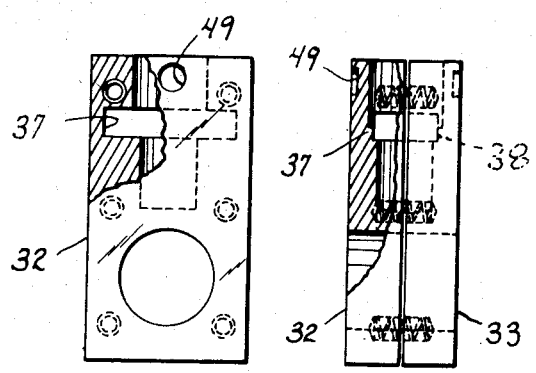
Figure 4 is an elevation, partly in section, of one of the valve gates.
Figure 5 is a side view of the valve gates, partly in section.
Figures 6, 7:
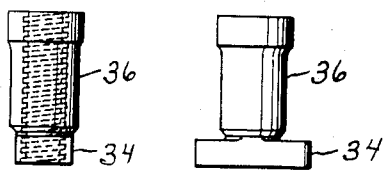
Figures 6 and 7 are front and side views of the actuating nut.

Referring to the drawings, the valve comprises a hollow body 10 having inlet and outlet openings 11 and 12 from the interior to the exterior thereof for the flow of fluid therethrough and a top opening 13 through which the valve parts may be inserted. Coupling connections 14 and 15 are secured to the inlet and outlet openings. It will be understood that the valve is symmetrical and either opening 11 or 12 may be used as the inlet. The top opening is closed by a bonnet 16 bolted thereto. There is a passage 17 through the bonnet within which is disposed valve stem 18. Inwardly facing shoulder 19 on the bonnet and collar 20 screw threaded to the bonnet form a thrust bearing about annular flange 21 on the valve stem. Suitable packing between the stem and bonnet is provided as indicated at 22.

Within the valve housing and secured to the inlet and outlet openings are the valve seats 30, 31. Between the valve seats are the valve gates 32, 33 pressed toward the adjacent seats by springs 35. A nut 36 is screwed onto the threaded valve stem 18. The lower end of the nut has a T-head 34 which engages slots 37, 38 in the gates to form a connection for raising and lowering same when the stem is rotated by means of handwheel 39. Further description of the valve will be confined to one half thereof, since the other half is identical therewith.

Seat 30 has a cylindrical neck portion 40 disposed in flow passage 11 and is secured therein by a tight fit. There is a port 41 through the seat connecting to the flow passage 42 through coupling 14, the inner end of the coupling abutting the outer end of the neck. A sealing groove 43 surrounds the neck adjacent the valve housing and a sealing groove 44 surrounds the port adjacent the gate passage 43 with lubricant reservoir 46. Piston 47 separates the lubricant in the reservoir from the line fluid. A passage 48 leads from the reservoir to the face of the seat and when the gate is closed a hole 49 therein provides communication between passage 48 and groove 44. Additional lubricant may be introduced into the system through grease gun fitting 50.

In operation, when the valve is closed, line pressure acting against the upstream valve will displace it slightly axially allowing the pressure to enter chamber 13 where it acts on the piston in the lubricant reservoir of the downstream seat and forces lubricant into the sealing grooves between the seat and the housing and between the seat and the gate. When the valve is opened, the hole 49 moves away from the passage 48 and cuts off the lubricant reservoir from the seal groove between the seat and gate before the seal groove is exposed to downstream pressure by further opening of the valve. Broadly, the cooperating hole 49, passage 48, and groove 44 constitute an auxiliary valve means for controlling flow of sealing material from the reservoir to the seal groove.

While a preferred embodiment of the invention has been shown and described it is obvious that many modifications thereof can be made by one skilled in the art without departing from the spirit of the invention and it is intended to protect by Letters Patent all forms of the invention falling within the scope of the following claims.

I claim:

1. A gate valve including a housing having opposed upstream and downstream flow ports and a valve chamber arranged transversely between said ports, a reciprocable gate in said chamber, an independent lubrication system for each port including a reservoir in said housing, means to inject sealing material into each system independent of the other, a movable barrier in each of said reservoirs, each of said systems including a groove arrangement in the housing consisting of a complete circuit surrounding a flow port, each said circuit having means providing a sealing material connection to its said reservoir solely when the valve is in closed position, said movable barrier being responsive to line pressure leaking into the chamber to urge sealing material into the downstream groove arrangement, said connection being disposed in said gate so that the opening movement of said gate disconnects said reservoir and circuit.

2. A lubricated gate valve including a housing, a seat member seated in said housing, interfitting portions on said member and in said housing, a peripheral groove for sealing material between said portions, a gate, means to slide the gate to open or closed position on said seat member, and means to provide a sealing area between said seat member and gate including an annular groove in the face of the seat member adjacent the gate, a reservoir to store sealing material in said seat member, distribution passages leading from said reservoir to said annular groove and to said peripheral groove, said distribution passage to said annular groove including a sealing material transfer conduit in said gate connecting the reservoir to said annular groove solely when said valve is in closed position so that the opening movement of said gate disconnects said reservoir and said annular groove, and means to introduce sealing material directly through said housing to the lubricating system comprising said grooves, passages, and reservoir.

3. A lubricated gate valve comprising a housing having a chamber therein and inlet and outlet passages therethrough, a removable valve seat inserted in each of said passages, a two part gate reciprocably mounted in said chamber, one part of said gate cooperating with each seat, spring means to urge said gate parts apart and toward said seats, means to reciprocate said gate, a sealing material reservoir in each seat, means to inject sealing material therein, a groove in the face of each seat adjacent the gate part extending entirely around the flowway through the seat, a passage from each reservoir to the face of each seat in spaced relation to the groove, sealing material transfer means carried by the gate to allow movement of sealing material from the reservoir to the groove when the valve is in closed position.

4. An automatic lubricated gate valve comprising a hollow body having inlet and outlet flow passages therethrough, said outlet flow passage having a valve seat, a gate cooperating with said seat to control flow of fluid through said body, means to move said gate, a sealing material groove in the face of the seat adjacent the gate and extending entirely around the outlet flow passage, a sealing material reservoir, means to introduce sealing material therein, means to subject the sealing material in said reservoir to a pressure that is a direct function of the upstream pressure, a passage connecting the reservoir to said face of the seat at a point outside of and spaced from said groove, a recess in the face of the gate adjacent the seat bridging the space between the end of said passage on said seat and said groove in the seat when the valve is in closed position, the overlap of the gate on the seat in the closed position being greater than the extent of said recess whereby said gate will block passage of sealing material from said reservoir to said groove when said gate has been moved toward open position a distance less than that required to crack open the valve.

5. An automatic lubricated gate valve comprising a hollow body having an inlet and an outlet, a reciprocably mounted gate therein to control the flow of fluid therethrough, means to open and close the gate, a seat having a surface around said outlet cooperating with said gate, a continuous groove in the face of the seat extending entirely around said outlet, conduit means to convey sealing material to said groove, means to apply pressure to said sealing material that increases and decreases with the pressure in said body on the upstream side of the gate, and a passage in the gate defining a portion of said conduit means movable with the gate to cut off said conduit means whenever said gate opens.

ALEXANDER S. VOLPIN.

References Cited in the file of this patent

UNITED STATES PATENTS

| Number | Name | Date |
|---|---|---|
| 2,433,638 | Volpin | Dec. 30, 1947 |

FOREIGN PATENTS

| Number | Country | Date |
|---|---|---|
| 418,931 | Great Britain | 1934 |